June 25, 1957     H. M. ZIMMERMAN     2,796,848
HANGING POULTRY FEEDER
Filed Nov. 9, 1956

INVENTOR.
HARVEY M. ZIMMERMAN,
BY

McMorrow, Berman + Davidson
ATTORNEYS.

United States Patent Office 2,796,848
Patented June 25, 1957

2,796,848

HANGING POULTRY FEEDER

Harvey M. Zimmerman, Ephrata, Pa.

Application November 9, 1956, Serial No. 621,227

1 Claim. (Cl. 119—53)

This invention relates to poultry feeders of the hanging type, that is, feeders suspended by a rope or equivalent means from an overhead support. Conventionally, a feeder of this type includes a cylindrical casing opening upwardly to permit feed to be deposited therein, said casing or feed container also being open at its bottom to permit the food to gravitate to a pan spaced downwardly from the lower end of the casing or container. The feed, flowing into the pan, flows outwardly from the container, so as to be accessible to the poultry.

It is common practice to adjust the container toward and away from the pan, for the purpose of correspondingly adjusting the size of the opening defined between the lower end of the contanier and the bottom of the pan to permit a selected quantity of feed to gravitate from the container. However, usually screw adjustments or equivalent means is employed, and this has been inconvenient and time-consuming. Further, screws tend to corrode and stick, making the adjustment of the container more difficult.

The main object of the present invention is to provide a generally improved hanging poultry feeder, the adjustment of which can be effected swiftly and easily, through the median of a depressible lever provided within the container and so arranged as to normally lock the container in selected positions to which it is adjusted in an axial direction, with the lever being at the same time swiftly movable, responsive merely to finger pressure, to an unlocking position to permit the readjustment of the container in respect to the pan.

Another object is to provide a feeder as stated that will be capable of manufacture at a cost little or no greater than required for conventional feeders having the deficiencies previously noted.

Still another object is to form the device in a manner such that it will be sure in operation, and will be adapted for use over a long period of time with minimum possibility of its getting out of order.

Other objects will appear from the following description, the claim appended thereto, and from the annexed drawing, in which like reference characters designate like parts throughout the several views, and wherein:

Figure 1:
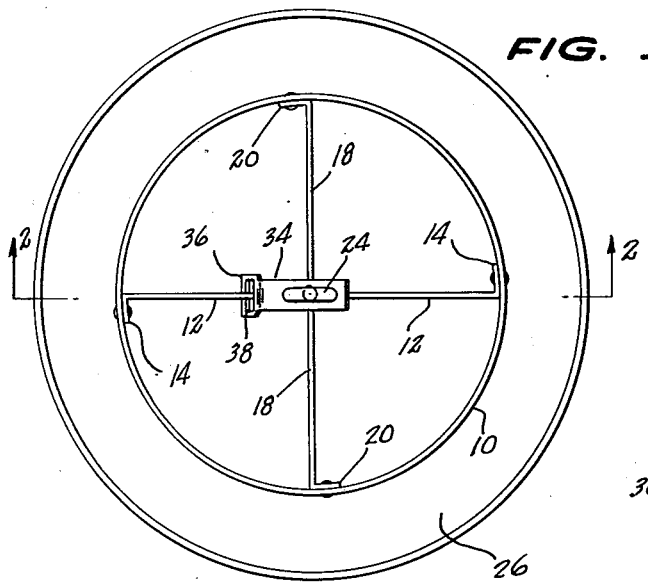
Figure 1 is a top plan view of a poultry feeder according to the present invention.
Figure 2:
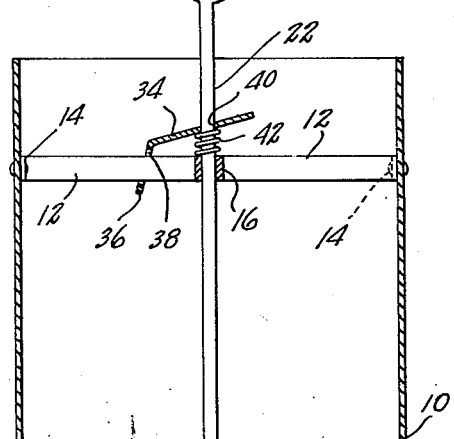
Figure 2 is a longitudinal sectional view therethrough, substantially on line 2—2 of Figure 1.

Referring to the drawings in detail, at 10 there is shown a cylindrical, vertically disposed container for a quantity of feed, the container opening at both its ends. Adjacent the upper and lower ends of the container (Figure 2) there are provided aligned support arms 12 extending radially within the container and formed at their outer ends with lateral extensions 14 riveted or otherwise fixedly secured to the side wall of the container. The arms 12 radiate from and are integral or otherwise made rigid with vertically aligned sleeves 16. Also integral with and projecting radially from the sleeves are support arms 18 terminating at their outer ends in laterally extended lugs 20 fixedly secured to the container 10, the support arms 18 being extended perpendicularly to the arms 12 as best shown in Figure 1.

A support rod 22 is vertically disposed, extending axially within the container through the sleeves 16, the sleeves being slidable upon the support rod. The rod 22 projects at its upper end above the upper end of the container 10, and is formed with an eye 24 adapted for connection to a suspension means such as a rope, not shown.

A pan 26 is disposed adjacent the lower end of the container 10, and is centrally formed with upwardly struck, frustro-conical bosses 28, 30 centrally apertured to receive the rod 22. Rod 22 at its lower end is threaded, to receive a nut 32 bearing against the underside of the boss 28 to hold the pan assembled with the rod.

Figure 3:
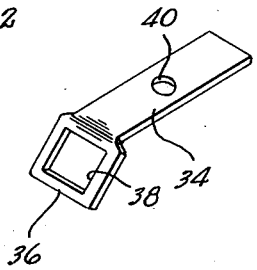
Figure 3 is an enlarged perspective view of the locking lever per se.
Figure 4:
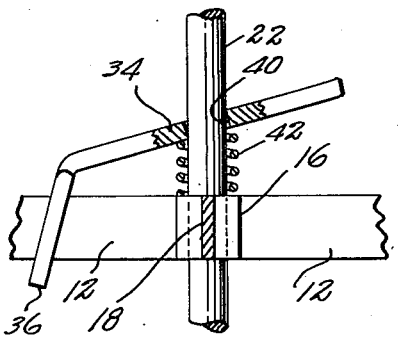
Figure 4 is an enlarged fragmentary view, partly in section, of the locking means and the associated components of the feeder.

Means is provided for locking the container in selected positions of adjustment axially of the rod 22. Said means includes a locking tongue 34 shown per se in Figure 3 and integral at one end with a generally rectangular, flat head 36 having a rectangular opening 38 loosely receiving one of the arms 12. Tongue 34, intermediate its ends, has an aperture 40 loosely receiving the rod 22, and formed to a diameter distinctly greater than that of the rod 22 as best shown in Figure 4. Interposed between tongue 34 and the upper sleeve 16 is a compression, coil spring 42, which normally biases the tongue 34 upwardly, the tongue pivoting upon the arm 12 that extends through the opening 38. The tongue pivots upwardly to a position in which it lies in a plane inclined slightly in respect to a plane perpendicularly intersecting the length of the rod 22. As a result, diametrically opposite portions of the edge of opening 40 bear against correspondingly diametrically opposed portions of the rod 22, and the tongue is thus adapted to frictionally bind against the rod 22, thereby holding the container 10 in selected positions to which it is adjusted axially of the rod.

It will be readily appreciated that if it is desired to adjust the container 10 upwardly or downwardly, one need merely exert a downward pressure with the finger against the free end of the tongue 34, compressing the spring 42 and shifting the finger downwardly to a position in which it lies in a plane perpendicularly intersecting the length of rod 22. This causes the edge of opening 40 to be shifted out of frictional engagement with the surface of the rod 22, so that the container, with the tongue held in a depressed position, can be shifted upwardly or downwardly in respect to the pan 26, to vary the distance between the bottom of the pan and the lower end of the container. This correspondingly adjusts the size of the orifice through which the feed may be poured into the pan from the container, to regulate the quantity of feed F that may be deposited within the pan.

As soon as the adjustment of the container has been completed, one releases the tongue 34 and the spring 42 expands to immediately bias the tongue to its rod-engaging position.

It will be seen that the device eliminates the need for screws and equivalent means for locking the container in selected positions of adjustment, and provides a locking means that is swiftly and easily operable, and that is capable of use over a long period of time without getting out of order. The effects of corrosion are negligible, as will be readily appreciated.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claim.

What is claimed is:

A poultry feeder including an elongated, vertically disposed suspension rod; a pan supported by the rod at the lower end of the rod; a container receiving the rod and disposed above the pan, said container being formed open at its lower end for gravitation of feed from the container into the pan; spider means within the container receiving the rod for slidably mounting the container upon the rod for adjustment toward and away from the pan, each of said spider means comprising a sleeve and a plurality of horizontal arms radiating from the sleeve; and locking means carried by one of the spider means and adapted to bind against the rod in selected positions to which the container is adjusted axially of the rod, comprising a tongue formed at one end with a flat head having an aperture loosely receiving one of the arms of said spider means so that said tongue is loosely pivoted upon said one spider means, the tongue having an intermediate portion formed with an opening loosely receiving the rod, the other end of the tongue being formed as a handle extending above and in closely spaced relation to another arm of said one spider means for depression of the handle toward said other arm by the thumb of a hand grasping said other arm, and a compression, coil spring interposed between the intermediate portion of the tongue and the sleeve of said one spider means, and normally biasing the tongue to a position in which the intermediate portion lies in a plane inclined in respect to a plane perpendicularly intersecting the length of the rod, thus to cause the edge of the opening to bind frictionally against the rod.

References Cited in the file of this patent

UNITED STATES PATENTS

| | | |
|---|---|---|
| 2,429,777 | Smith | Oct. 28, 1947 |
| 2,438,080 | Van Meeteren | Mar. 16, 1948 |
| 2,721,537 | Miller | Oct. 25, 1955 |
| 2,727,492 | Hatcher | Dec. 20, 1955 |